Nov. 23, 1926.

H. J. MUNSTER 1,607,799

CIRCUIT CLOSER

Filed July 25, 1925   3 Sheets-Sheet 1

Harry J. Munster, Inventor

Witnesses
C. E. Churchman
J. Stanley Burch

By Richard B. Owen
Attorney

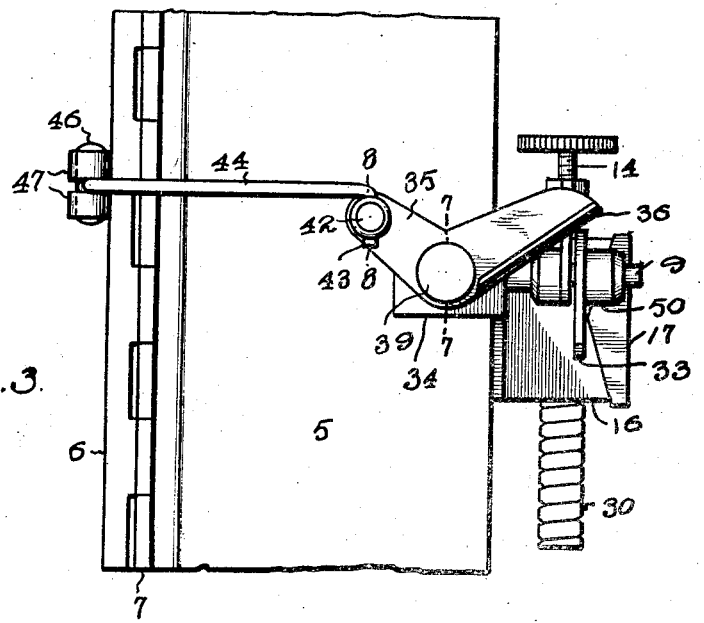
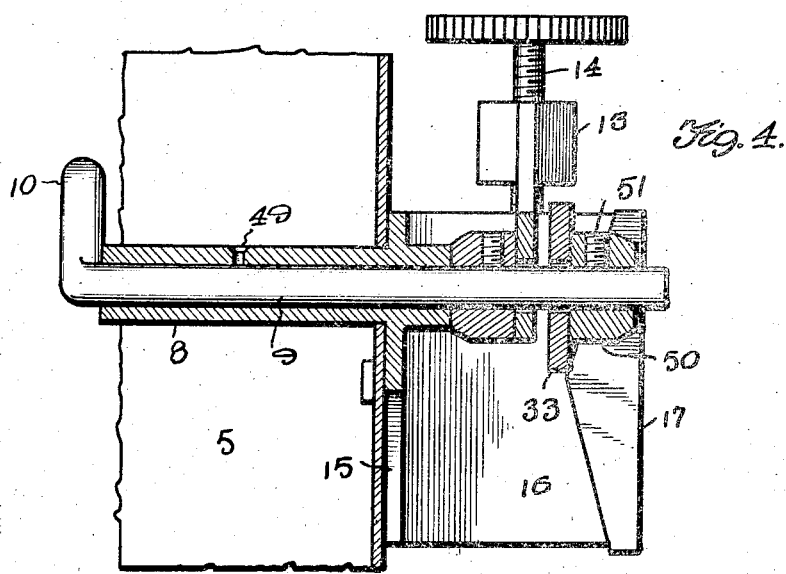

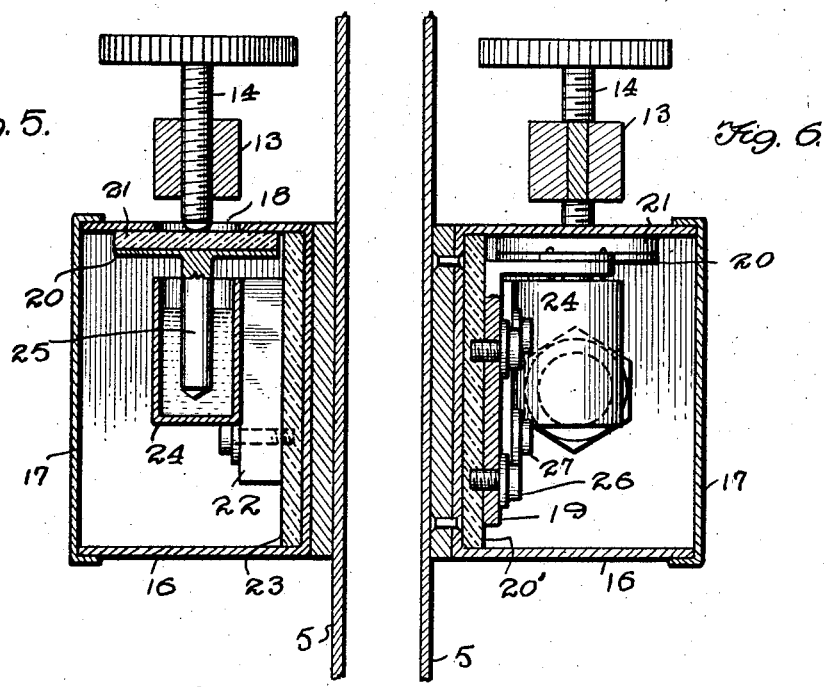

Patented Nov. 23, 1926.

1,607,799

UNITED STATES PATENT OFFICE.

HARRY J. MUNSTER, OF SAN DIEGO, CALIFORNIA.

CIRCUIT CLOSER.

Application filed July 25, 1925. Serial No. 46,111.

This invention relates to circuit closers for film exhaustion signals of motion picture machines, and has particular reference to an improvement upon the device shown and describe in my United States Letters Patent No. 1,479,311, dated January 1, 1924.

The primary object of the present invention is to generally simplify and improve devices of the above kind whereby the same may meet with all of the requirements for a successful commercial use.

Another object of the invention is to provide a circuit closer of the above kind which is extremely simple and durable in construction as well as efficient and entirely reliable in operation.

Still another object of the invention is to provide improved means for automatically raising the film contacting arm clear of or above the flanges of the film reel and to simultaneously break the signal circuit upon opening the door of the film magazine preparatory to removing the film reel therefrom.

Other objects will appear as the nature of the invention is better understood, and the same consists in the novel form, combination and arrangement of parts hereinafter more fully described, shown in the accompanying drawings and claimed.

Figure 1:
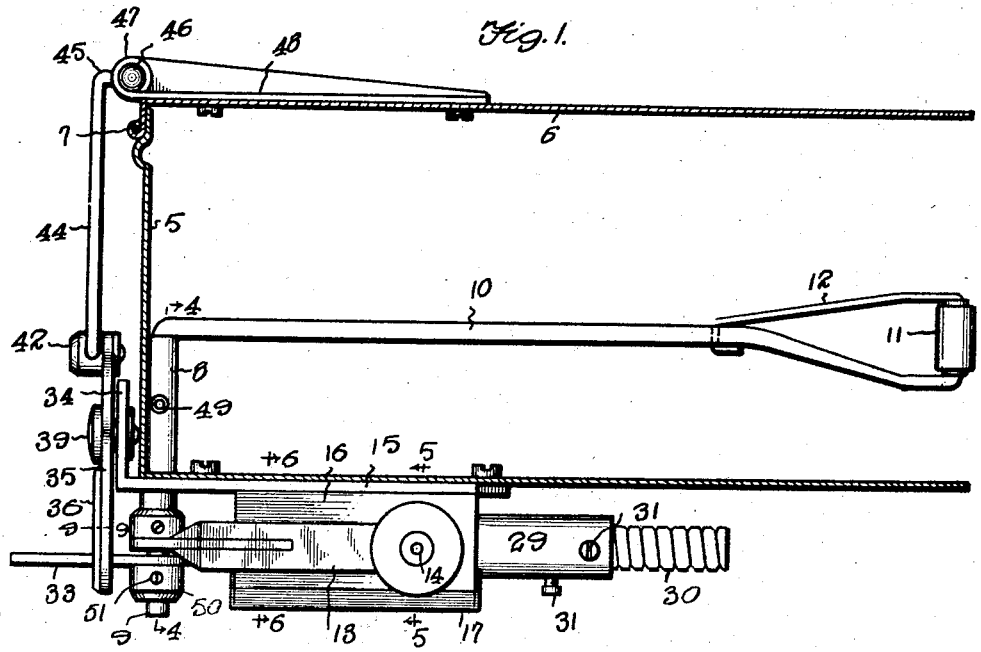
Figure 2:
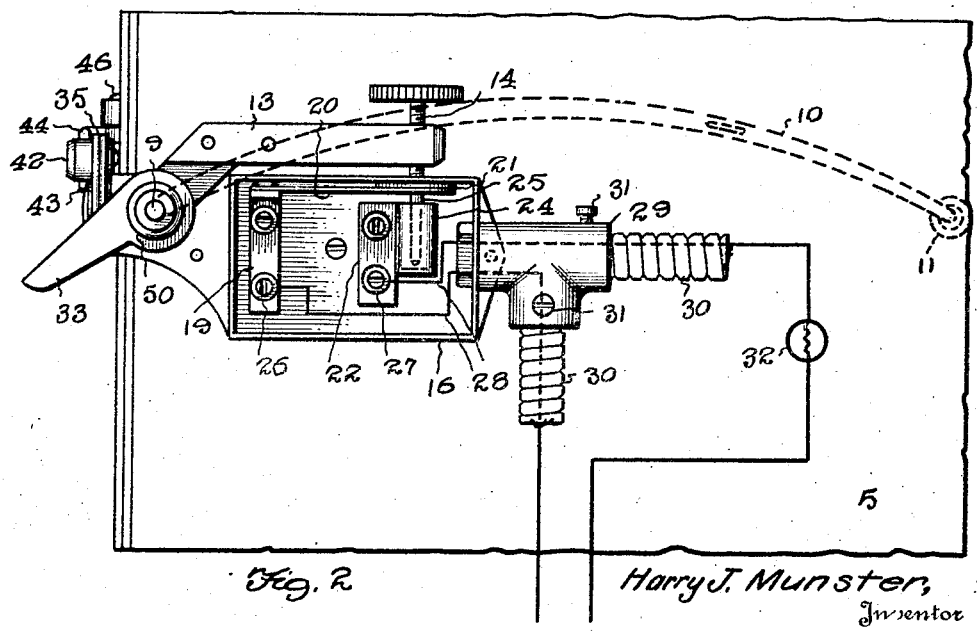

In the drawings, wherein like reference characters indicate corresponding parts throughout the several views, Figure 1 is a fragmentary horizontal section of a film reel magazine equipped with a circuit closer constructed in accordance with the present invention, Figure 2 is a side elevational view of the device shown in Figure 1, Figure 3 is an end elevational view looking towards the right of Figures 1 and 2, Figure 4 is an enlarged fragmentary view taken in vertical transverse section substantially upon line 4—4 of Figure 1, Figure 5 is a view similar to Figure 4 taken substantially upon line 5—5 of Figure 1, Figure 6 is a view similar to Figure 5 and taken substantially upon line 6—6 of Figure 1, Figure 7 is a detailed sectional view of parts of the invention taken substantially upon line 7—7 of Figure 3, Figure 8 is a view similar to Figure 7 taken substantially upon line 8—8 of Figure 3, Figure 9 is a sectional view taken substantially upon line 9—9 of Figure 1, and Figure 10 is an enlarged fragmentary perspective view of a detail of the invention carried by the film magazine door.

Referring more in detail to the drawings, 5 indicates a conventional form of upper film reel magazine of a motion picture machine, which magazine is closed at one side by means of a swinging door 6 which is hinged upon a vertical axis as at 7 to the front end of the magazine 5 in the usual way. As is well known in the art, the door 6 is swung open for permitting insertion of a film reel into the magazine or removal of the same therefrom as found necessary.

Suitably fixed to and projecting through the other side wall of the magazine 5 adjacent the front end thereof is a bearing sleeve 8 whose inner end terminates substantially mid-way between the sides of the magazine and within which is journaled a shaft 9. The shaft 9 thus extends transversely of the magazine 5, and extending rearwardly from and at right angles to the shaft 9 is an integral film contacting arm 10 which is preferably of the upwardly curved form indicated by dotted lines in Figure 2 and which is so disposed as to be in a vertical plane substantially mid-way between the flanges of the film reel when the latter is operatively disposed within the magazine 5. The arm 10 has a roller 11 journaled upon its free rear end, which roller is preferably covered with a tube of soft material such as rubber, felt or the like. The roller 11 permits free rotation of the film reel and its yielding covering prevents marring of the film.

Attached to the arm 10 is a spring 12 preferably formed of resilient wire, and the free end of this spring 12 is disposed to retain the roller 11 upon the end of the arm 10. For this purpose the transversely extending shaft or end portion of the arm 10 upon which the roller 11 is journaled may be provided with a socket into which the end of the spring 12 projects.

An arm 13 is secured to the projecting outer end portion of the shaft 9 exteriorly of the magazine 5, and the arm 13 projects rearwardly parallel with the arm 10 and has an adjusting screw 14 threaded through the free rear end thereof.

Rigidly secured to the side wall of the magazine 5 adjacent the sleeve 8 is a plate 15 to which is fastened a receptacle 16, the outer side of which is closed by means of a removable cover 17, and the upper wall of which is formed with an opening 18 into which the adjusting screw 14 projects. A bracket 19 of conducting material is secured to a strip of insulating material 20' which is suitably secured to the inner side wall of the casing 16, and the horizontal upper end portion of the conducting bracket 19 has one end of a horizontal leaf spring 20 secured thereto. The spring 20 projects rearwardly so as to terminate beneath the opening 18, and secured upon the free rear end of this spring 20 is a plate 21 of insulating material which is engaged by the lower end of the screw 14. A further bracket 22 is secured to another insulating strip 23 which is also secured to the inner side wall of the casing 16 rearwardly of the bracket 19, and this bracket 22 has an integral metallic cup 24 into which projects a contact pin 25 rigid with and depending from the free rear end of the spring 20. The spring 20 is normally tensioned to flex upwardly so that the plate 21 closes the opening 18 under normal conditions and the lower end of the pin 25 is spaced above the bottom of the cup 24 as well as concentric with the latter as shown in Figure 5. The conducting brackets 19 and 22 have binding posts 26 and 27 to which are attached the wires 28, and it is apparent that when the contact pin 25 is lowered to engage the bottom of the cup 24 current may pass from one wire to the other.

Secured to the rear end of the casing 16 is a T-fitting 29 in branches of which are adapted to be secured the well known flexible metallic conduits 30 which form protective coverings for the wires 28, the fitting 29 being provided with set screws 31 for this purpose. The wires 28 lead to a source of electricity, not shown, and included in the circuit of this source of electricity is a suitable signal element such as the lamp 32.

When the reel containing the film is positioned within the magazine 5, the roller 11 is disposed to bear upon the film, and as the film is unwound from the reel during the projection of the picture play, the arm 10 will lower by gravity until it reaches a predetermined point immediately prior to complete exhaustion of the film from the reel, whereupon the contact pin 25 engages the bottom of the cup 24 so as to close the circuit of the signal element 32 for warning the operator or attendant of the moving picture machine to have the other motion picture machine ready to be started. The arms 13 and 10 are of sufficient weight to overcome the action of the spring 20, and the cup 24 is adapted to contain oil or equivalent fluid for preventing damage by fire from sparks emitted between the contact pin 25 and the bottom of the cup 24.

A second arm 33 is secured to the projecting outer end portion of the shaft 9, and this arm 33 normally projects forwardly and downwardly to occupy the inclined position illustrated in Figure 2. The plate 15 has an angular extension 34 upon the forward end thereof, and this extension 34 projects inwardly so as to lie parallel with and in spaced relation to the front end of the magazine 5 as shown in Figure 1. Pivoted to the extension 34 is a bell crank lever 35 which is arranged so that its arms project upwardly as shown in Figure 3, the free end portion of the outer arm of the bell crank lever 35 being disposed to overlie the arm 33 and having a downwardly and outwardly inclined lower edge portion 36 as clearly shown in Figure 9. The bell crank lever is pivoted upon a pin 37 at one end of which is reduced as at 38 to project through a relatively small opening of the extension 34, and the other end of which is enlarged to provide a head 39 for retaining the bell crank lever in place. The reduced end portion 38 of the pin 37 is headed as at 40 by a riveting operation so as to secure the same to the extension 34 as shown clearly in Figure 7.

A pin 41 extends loosely through the free end of the bell crank lever 35 as shown in Figure 8, and this pin 41 is carried by a block 42 that is formed with a vertical transverse opening into which projects the adjacent depending end 43 of a rod 44. The end 43 is loosely disposed in the opening of the block 42 and the pin 41 is held in place in the transverse opening of the inner arm of the bell crank lever 35 by riveting or the like as at 45. The rod 44 is disposed in a substantially horizontal position and projects from the block 42 past the hinge 7 of the door 6 where it terminates in a rearwardly projecting end portion 45 loosely threaded in a vertical cross bar 46, the ends of which are journaled in spaced super-imposed bearing sleeves 47 formed upon the projecting forward end of a horizontal bracket 48 secured to the outer side of the door 6. When the arm 13 lowers sufficiently to engage the contact pin 25 with the bottom of the cup 24, the arm 33 moves to a point adjacent the lower edge of the outer arm of the bell crank lever 35, and it will thus be seen that when the door 6 is swung open the bell crank lever 35 will be swung so that the outer arm thereof will press downwardly upon the arm 33 and cause the arms 10 and 13 to swing upwardly. This effects disengagement of the contact pin 25 from the bottom of the cup 24 so as to break the circuit of the signal element 32 and also causes the arm 10 to rise clear of the flanges of the film reel so that the latter may be removed from the magazine and a new full reel inserted in place thereof. When the arm 13 is thus raised the spring 20 will cause the plate 21 to cover or close the opening 18, and by reason of the inclined lower edge 36 of the bell crank lever 35, resistance to movement of the outer arm of the bell crank lever 35 along the upper edge of the arm 33 is reduced. It will be seen, that, by reason of the connections above described, the ends of the push rod 44 are substantially universally connected to the door 6 and the bell crank lever 35 for permitting the relative horizontal and vertical movements of the parts.

With the above construction it will be seen that the elevation of the arms 10 and 13 is effected immediately upon starting to open the door 6. It will also be seen that the only forwardly projecting part is the arm 33 which may be formed of quite a short length so that the machine may be placed close to the front wall of the operator's booth.

The bearing sleeve 8 may be provided with an opening 49 for facilitating lubrication of shaft 9, and the arms 13 and 33 are preferably attached to ends of collars 50 held to the shaft 9 by set screws 51.

From the above description it will be seen that all current conducting parts are properly incased so as to reduce the liability of fire to a minimum, and it is not necessary to completely open the door 6 before the arms 10 and 13 are actuated for respectively permitting removal of the reel and causing breaking of the signal circuit.

Minor changes may be made without departing from the spirit and scope of the invention as claimed.

What I claim as new is:

1. In a film exhaustion signal, a film reel magazine, a horizontal shaft journaled transversely through a side of said magazine and having a rearwardly projecting film contacting arm upon its inner end, a casing secured to said side of the magazine exteriorly of the latter and having an opening in the top thereof, a rearwardly projecting arm fixed to the outer end of said shaft and extending above the casing, a vertical screw adjustably threaded through said second named arm coincident with said casing opening, a leaf spring mounted in said casing and having an insulation plate upon its free end engageable by said screw, a contact fixed to the under side of the free end of said spring, and a fixed contact mounted in the casing beneath the contact of the spring, said spring being normally tensioned to bring the insulation plate against the top of the casing for closing the opening of the latter and being flexible downwardly when the arms are allowed to lower for engaging the spring carried contact with the fixed contact upon substantial exhaustion of the film from a reel in said magazine.

2. In a device of the class described, a film reel magazine closed at one side by means of a horizontally swinging door, a vertically swinging bell crank lever pivoted at the front end of the magazine, a rod having substantially universal connection at its ends respectively with the door and said bell crank lever, a horizontal shaft journaled transversely through the other side of the magazine and having a forwardly and downwardly projecting arm upon its outer end disposed beneath an arm of the bell crank lever, and rearwardly projecting film contacting and switch arms respectively carried by the inner and outer ends of said transverse shaft, whereby the film contacting arm will be raised clear of the flanges of a film reel in the magazine and the switch arm raised to circuit breaking position upon opening of the magazine door.

3. In a device of the class described, a film reel magazine closed at one side by means of a horizontally swinging door, a vertically swinging bell crank lever pivoted at the front end of the magazine, a rod having substantially universal connection at its ends respectively with the door and said bell crank lever, a horizontal shaft journaled transversely through the other side of the magazine and having a forwardly and downwardly projecting arm upon its outer end disposed beneath an arm of the bell crank lever, and rearwardly projecting film contacting and switch arms respectively carried by the inner and outer ends of said transverse shaft, whereby the film contacting arm will be raised clear of the flanges of a film reel in the magazine and the switch arm raised to circuit breaking position upon opening of the magazine door, an arm of the bell crank lever having the lower edge portion thereof forwardly inclined for engagement with the upper edge of said forwardly and downwardly inclined arm.

4. In a device of the class described, a film reel magazine closed at one side by means of a horizontally swinging door, a vertically swinging bell crank lever pivoted at the front end of the magazine, a rod having substantially universal connection at its ends respectively with the door and said bell crank lever, a horizontal shaft journaled transversely through the other side of the magazine and having a forwardly and downwardly projecting arm upon its outer end disposed beneath an arm of the bell crank lever, and rearwardly projecting film contacting and switch arms respectively carried by the inner and outer ends of said transverse shaft, whereby the film contacting arm will be raised clear of the flanges of a film reel in the magazine and the switch arm raised to circuit breaking position upon opening of the magazine door, the universal connection between one end of the rod and the bell crank lever embodying a block carried by the bell crank lever and rotatable upon a horizontal axis, said rod having a depending end journaled through the block.

5. In a device of the class described, a film reel magazine closed at one side by means of a horizontally swinging door, a vertically swinging bell crank lever pivoted at the front end of the magazine, a rod having substantially universal connection at its ends respectively with the door and said bell crank lever, a horizontal shaft journaled transversely through the other side of the magazine and having a forwardly and downwardly projecting arm upon its outer end disposed beneath an arm of the bell crank lever, and rearwardly projecting film contacting and switch arms respectively carried by the inner and outer ends of said transverse shaft, whereby the film contacting arm will be raised clear of the flanges of a film reel in the magazine and the switch arm raised to circuit breaking position upon opening of the magazine door, the universal connection between the rod and the door embodying a bracket secured to the door and having a pair of spaced superimposed bearings, a bar journaled in said bearings, and a rearwardly projecting extension on the end of the rod loosely rotatably engaged with said bar.

6. In a device of the class described, a film reel magazine closed at one side by means of a horizontally swinging door, a vertically swinging bell crank lever pivoted at the front end of the magazine, a horizontal shaft journaled transversely through the other side of the magazine and having a forwardly and downwardly projecting arm upon its outer end disposed beneath an arm of the bell crank lever, rearwardly projecting film contacting and switch arms respectively carried by the inner and outer ends of said transverse shaft, and operative connections between the door and the bell crank lever whereby the film contacting arm will be raised clear of the flanges of a film reel in the magazine and the switch arm raised to circuit breaking position upon opening of the magazine door.

7. In a film exhaustion signal, a casing having an opening in the top thereof, a swinging switch arm extending above the casing, a vertical screw adjustably threaded through said switch arm coincident with said casing opening, a leaf spring mounted in said casing and having an insulation plate upon its free end engageable by said screw, a contact fixed to the under side of the free end of said spring, and a fixed contact mounted in the casing beneath the contact of the spring, said spring being normally tensioned to bring the insulation plate against the top of the casing for closing the opening of the latter and for disengaging the contact of the spring from said fixed contact.

8. In a film exhaustion signal, a casing having an opening in the top thereof, a swinging switch arm extending above the casing, a vertical screw adjustably threaded through said switch arm coincident with said casing opening, a leaf spring mounted in said casing and having an insulation plate upon its free end engageable by said screw, a contact fixed to the under side of the free end of said spring, and a fixed contact mounted in the casing beneath the contact of the spring, said spring being normally tensioned to bring the insulation plate against the top of the casing for closing the opening of the latter and for disengaging the contact of the spring from said fixed contact, conducting plates mounted within and insulated from the casing and having binding posts respectively in electrical connection with the contact of the spring and the fixed contact, and an inlet fitting carried by the casing.

9. In a film exhaustion signal, a film reel magazine, a vertically movable film contacting arm in said magazine, a casing carried by the magazine and having an opening therein, an actuating member arranged outwardly of and coincident with said casing opening and operatively connected to the film contacting arm to be moved thereby, a spring mounted in said casing, an insulation plate engageable by said actuating member, a contact fixed to said spring, and a fixed contact mounted in the casing adjacent the contact of the spring, said spring being normally tensioned to bring the insulation plate against the casing for closing the opening of the latter and being flexible when the actuating member and the film contacting arm are allowed to move for engaging the spring-carried contact with the fixed contact upon substantial exhaustion of the film from a reel in said magazine.

10. In a device of the class described, a film reel magazine closed at one side by means of a horizontally swinging door, a vertically swinging bell crank lever pivoted at one end of the magazine, a rod having substantially universal connection at its ends respectively with the door and said bell crank lever, operatively connected vertically movable film contacting and switch elements mounted on the magazine, and means operatively connected to said elements and operatively associated with said bell crank lever for moving the film contacting element clear of the flanges of a film reel in the magazine and simultaneously moving the switch element to circuit breaking position upon opening of the magazine door.

In testimony whereof I affix my signature.

HARRY J. MUNSTER.